United States Patent
Kibler

(10) Patent No.: US 8,678,411 B2
(45) Date of Patent: Mar. 25, 2014

(54) RETRACTABLE STAIRS FOR A TRUCK OR TRAILER

(75) Inventor: Scott A. Kibler, Kensington, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 180 days.

(21) Appl. No.: 13/361,225

(22) Filed: Jan. 30, 2012

(65) Prior Publication Data
US 2013/0193666 A1    Aug. 1, 2013

(51) Int. Cl.
*B60R 3/02* (2006.01)

(52) U.S. Cl.
USPC .......................................... 280/166; 182/127

(58) Field of Classification Search
USPC ..................... 280/163, 166, 169; 182/88, 127
See application file for complete search history.

(56) References Cited

U.S. PATENT DOCUMENTS

| | | | |
|---|---|---|---|
| 2,642,217 A | 6/1953 | Jennings | |
| 3,756,622 A | 9/1973 | Pyle et al. | |
| 4,139,078 A | 2/1979 | Keller | |
| 5,205,603 A * | 4/1993 | Burdette, Jr. | 296/62 |
| 5,228,707 A | 7/1993 | Yoder | |
| 5,425,608 A | 6/1995 | Reitnouer | |
| 5,868,412 A | 2/1999 | Hinkle | |
| 7,168,722 B1 | 1/2007 | Piotrowski et al. | |
| 7,445,268 B2 * | 11/2008 | Faulkiner | 296/183.1 |
| 7,469,915 B2 * | 12/2008 | Horn et al. | 280/163 |
| 8,182,013 B1 * | 5/2012 | Alvarado | 296/62 |

* cited by examiner

*Primary Examiner* — John Walters
(74) *Attorney, Agent, or Firm* — Sand & Sebolt

(57) ABSTRACT

A retractable stair assembly for a vehicle includes a track assembly mounted on a vehicle frame beneath a workbed, a step assembly, and first and second pivot assemblies that engage the track and step assemblies together. The step assembly moves between a storage position where it is disposed between tracks of the track assembly, and an operational position where it extends outwardly from the tracks, through an aperture in the vehicle's wall panel, and angles downwardly toward the ground. A foldable handrail on the step assembly moves between a collapsed position and an extended position. The handrail is in the extended position when the step assembly is operational and folds to the collapsed position when the step assembly is stored. A door is engaged with the track assembly and covers the aperture when the step assembly is stored. A flange extends from the door and supports a license plate thereon.

22 Claims, 13 Drawing Sheets

RETRACTABLE STAIRS FOR A TRUCK OR TRAILER

BACKGROUND OF THE INVENTION

1. Technical Field

This invention relates generally to trucks and trailers. More particularly, this invention relates to stairs for use on a truck or trailer body. Specifically, this invention is directed to a set of stairs that are retractable into a cavity in the body of the truck or trailer, and which are extendable therefrom when needed.

2. Background Information

Trucks and trailers are typically built so that their working surfaces are positioned some distance vertically from the ground. Consequently, when it is necessary for the truck driver or some other worker to climb onto the working surface, such as the bed of a flatbed trailer, the vertical distance from the ground to the bed makes getting on and off the bed potentially hazardous.

In order to address this situation, a variety of retractable stair systems have been proposed in the prior art. For example, U.S. Pat. No. 2,642,217 to Jennings discloses a retractable ladder for vehicles. A pair of rails is mounted on the underside of a truck body and each rail includes a longitudinal slot. The ladder includes a first end and a second end. Pins are provided at the first end and these pins are engaged in the slots and act as pivots to move the ladder from a horizontal storage orientation to an angled use orientation, and the pins enable the ladder to slide inwardly between the rails when in a horizontal position. A leaf spring keeps the ladder in its storage position and a catch is also provided to lock the ladder in the storage location beneath the truck body. A handle is provided to enable the driver to lift the ladder over the catch and move it into the operational position.

U.S. Pat. No. 3,756,622 to Pyle et al discloses a stair assembly comprised of a frame that is secured to the underside of the truck or trailer and a slider that is able to move into and out of the frame. The frame is comprised of at least two U-shaped channels that are configured and oriented to receive the slider therein. The slider is comprised of two L-shaped channels that have a number of step members pivotally engaged therebetween. The slider is manually lifted upwardly so that it is horizontally aligned with the U-shaped channels and is then slid into the frame. When the slider is in this horizontal orientation, each step is aligned with the plane of the slider. When the driver needs to use the stairs, he slides the slider out of the frame so that it is initially horizontally disposed. The front edge of the frame includes a downwardly extending region that permits the driver to then rotate the slider into a position where it engages the ground. Stops on the frame prevent the slider from being accidentally withdrawn therefrom. As the slider rotates into engagement with the ground, the steps pivot relative to the slider from a first position where they are aligned with the plane of the slider, to a second position where they are angled relative to the plane of the slider and are in a horizontal orientation for use by the driver.

U.S. Pat. No. 4,139,078 to Keller is fairly similar to the device disclosed by Jennings in U.S. Pat. No. 2,642,217 except it includes first and second retaining members. The first retaining member is a cord and hook which keep the ladder secured within a storage compartment beneath the truck bed when the ladder is not in use. The device further includes a second retaining member in the form of wedge-shaped abutments which prevent the ladder from being entirely withdrawn from the storage compartment when it is moved from a storage position to an operational position.

U.S. Pat. No. 5,205,603 to Burdette, Jr. discloses a telescoping ladder assembly that slides into and out of a cavity in the tailgate of a truck bed. Parallel grooves are provided in the tailgate and a pair of runner plates is received in these grooves. The runner plates are generally planar members and each defines a slot therein. Axles secured to one end of a first ladder section are engaged in these two opposed slots and this arrangement pivotally engages the first ladder section to the runner plates and also permits the first ladder section to slide along the grooves when in a horizontal orientation. The first ladder section is made up of two U-shaped legs and a plurality of steps that extend between the steps. A second ladder section is engaged with the first ladder section so that it is able to telescope inwardly and outwardly relative to the first ladder section. A locking mechanism secures the first and second sections together. When the device is to be used, it is first moved to a collapsed position by sliding the second ladder section along the legs of the first ladder section so that the second ladder section is disposed adjacent the first ladder section. The collapsed ladder is then pivoted about the axles at the one end of the first ladder section so that it is generally horizontal and aligned with the plane of the two runner plates. The collapsed ladder is pushed toward the end of the tailgate and this movement causes the collapsed ladder to slide into the cavity in the tailgate. The ladder is subsequently removed therefrom by reversing these steps.

U.S. Pat. No. 5,228,707 to Yoder discloses an automatic stepladder assembly that moves between a storage area beneath the vehicle and an operational position in front of the vehicle. The storage area is located beneath the floor of the vehicle and is accessed through an opening in the side wall of the vehicle. The stepladder assembly is comprised of a staircase, a slider and a driver. The staircase includes two parallel, spaced apart casings and a plurality of steps that are fixedly mounted between the casings. The orientation of the steps relative to the casings does not change as the stepladder assembly is moved back and forth between a storage position and an operational position. The staircase is pivotally connected to the slider at its upper end by pins. The slider includes two parallel side walls and two cross walls that are secured to each other in a generally rectangular configuration. A pair of parallel, horizontally-oriented slide rails is connected to the vehicle frame and extends for a distance under the vehicle. The slide rails are generally C-shaped or U-shaped in cross-section and open toward each other. The staircase and slider ride within these rails between a storage position and an operational position. A roller disposed between the rails and at the edge of the vehicle frame and a motor aid in moving the staircase between the storage and operational positions. When the stepladder moves to the operational position, the slider extends for a distance outwardly beyond the side of the vehicle and a top wall of the slider becomes the first step in the stepladder.

While these devices serve the purposes for which they were intended, there is still a need in the art for a stair assembly that is quickly and readily moved from a storage position to an operational position, and which provides a safe and secure way to climb onto and off of a truck bed

BRIEF SUMMARY OF THE INVENTION

The device of the present invention comprises a retractable stair assembly for a vehicle and a vehicle including the same. The stair assembly includes a track assembly that is mounted on the vehicle, a step assembly, and first and second pivot assemblies that the track assembly and step assembly together. The step assembly is movable between a storage position where it is disposed between a pair of tracks of the track assembly, and an operational position where the step assembly extends outwardly from the first ends of the tracks, through an aperture in a wall panel of the vehicle, and angles downwardly relative to the wall panel. A foldable handrail is provided on the step assembly and is movable between a collapsed position and an extended position. The handrail is in the extended position when the step assembly is operational and is in the collapsed position when the step assembly is stored. A door is engaged with the track assembly and covers the aperture when the step assembly is stored. A license plate flange extends from the bottom of the door.

In a first aspect of the invention, the retractable stair assembly for a vehicle comprises:
  a track assembly adapted to be engaged to a portion of the vehicle's frame; said track assembly comprising:
  a first track and a second track disposed parallel to each other; wherein each of the first and second tracks has an interior surface, an exterior surface, a top, a bottom, a first end and a second end;
  a space defined between the interior surface of the first track and the interior surface of the second track;
  a slot defined in each of the first and second tracks, said slot extending from proximate the first end thereof to proximate the second end thereof;
  a step assembly having a first end and a second end;
  a first pivot assembly securing the first end of the step assembly to the track assembly;
  a second pivot assembly securing a portion of the step assembly intermediate the first and second ends thereof to the track assembly; and wherein the step assembly is movable between a storage position and an operational position; and when the step assembly is in the storage position it is disposed in the space between the first and second tracks; and when the step assembly is in the operational position it extends outwardly and downwardly from the first ends of the first and second tracks and is adapted to extend downwardly toward a surface upon which the vehicle rests.

A second aspect of the invention comprises in combination:
  a vehicle having a frame, a workbed mounted on the frame and having a lower surface adapted to be disposed a distance above a surface upon which the vehicle rests; and a wall panel mounted on the frame substantially at right angles to the workbed;
  an aperture defined in the wall panel; said aperture providing entry to a region disposed beneath the lower surface of the workbed;
  a stair assembly engaged with the frame of the vehicle; wherein the stair assembly comprises:
    a step assembly having a first end and a second end;
    a track assembly mounted on the vehicle frame in the region below the lower surface of the workbed and inwardly of the aperture; said track assembly comprising:
    a first track and a second track extending inwardly from adjacent the aperture and substantially at right angles to the wall panel, wherein the first and second tracks are disposed parallel to each other and each has an interior surface, an exterior surface, a top, a bottom, a first end and a second end;
    a space defined between the interior surface of the first track and the interior surface of the second track;
    a slot defined in each of the first and second tracks, said slot extending from proximate the first end thereof to proximate the second end thereof;
    a first pivot support extending downwardly from the bottom of the first track and a second pivot support extending downwardly from the bottom of the second track;
    a first pivot assembly securing the first end of the step assembly to the track assembly; said first pivot assembly engaging in the slots of the first and second tracks;
    a second pivot assembly securing a portion of the step assembly intermediate the first and second ends thereof to the first and second pivot supports of the track assembly; and wherein the step assembly is movable between a storage position and an operational position; and when the step assembly is in the storage position it is disposed in the space between the first and second tracks and beneath the lower surface of the workbed; and when the step assembly is in the operational position it extends outwardly from the first ends of the first and second tracks and through the aperture in the wall panel; ad the step assembly is angles downwardly and outwardly from the wall panel and towards the surface upon which the vehicle rests.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
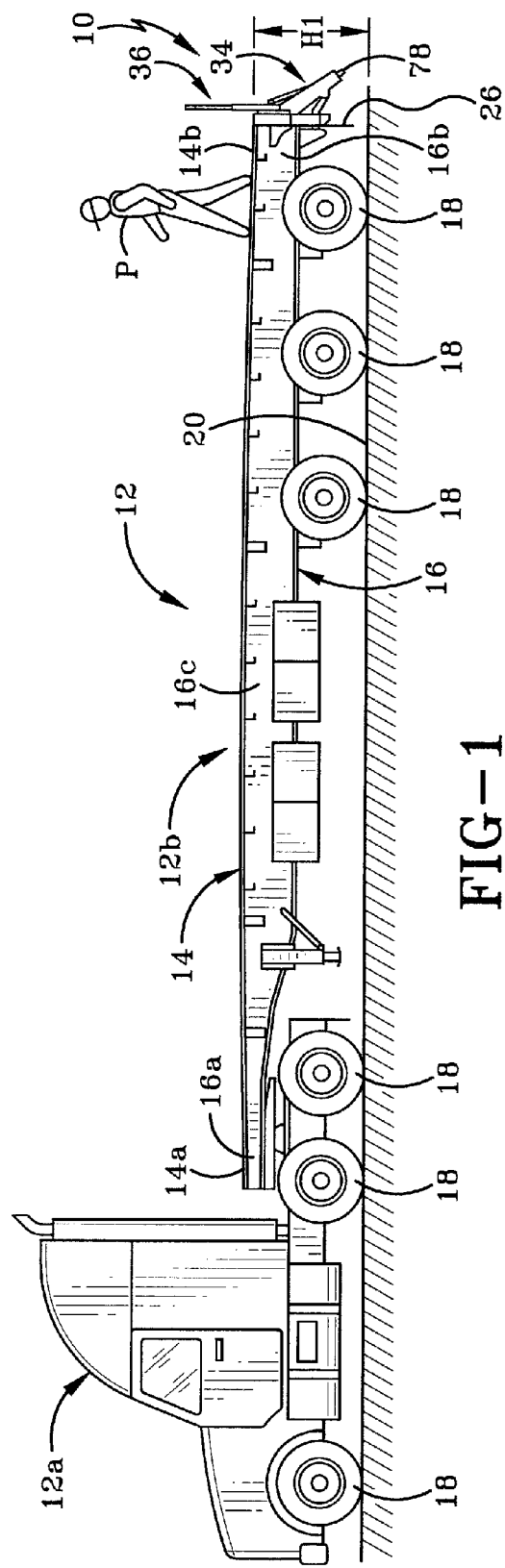
FIG. 1 is a side elevational view of a tractor trailer incorporating the stair assembly of the present invention, with the stair assembly shown in the operational position.

Referring to FIGS. 1-12, there is shown a stair assembly in accordance with the present invention and generally indicated at 10. Stair assembly 10 is configured to be mounted on a vehicle 12, such as a tractor trailer although any other type of vehicle, such as a panel van could incorporate stair assembly 10. Alternatively, any stationary structure, such as a building having a loading dock, which only periodically requires stairs to move between a lower elevation and a higher elevation, could incorporate the stair assembly 10 of the present invention. As illustrated in the attached figures, vehicle 12 comprises a tractor 12a and a trailer 12b. Trailer 12b includes a bed 14 for carrying a load. Bed 14 has a front end 14a and a rear end 14b. Bed 14 is mounted on a frame 16 that is made up of a plurality of different frame members, only some of which are illustrated and numbered in the attached figures. Vehicle 12 further includes bumpers 17, wheels 18 which are engaged with frame 16 and retain the bed 14 a distance "H1" away from a road surface 20. A rear panel 22 made up from one or more sections of planar sheets of metal that are secured to frame 16. Tail lights 24 and mud flaps 26 are also secured to one or both of rear panel 22 and frame 16. An aperture 28 is defined in rear panel 22 and stair assembly 10 is mounted on frame 16. Portions of stair assembly 10 are movable through aperture 28 as will be hereinafter described.

Figure 11:
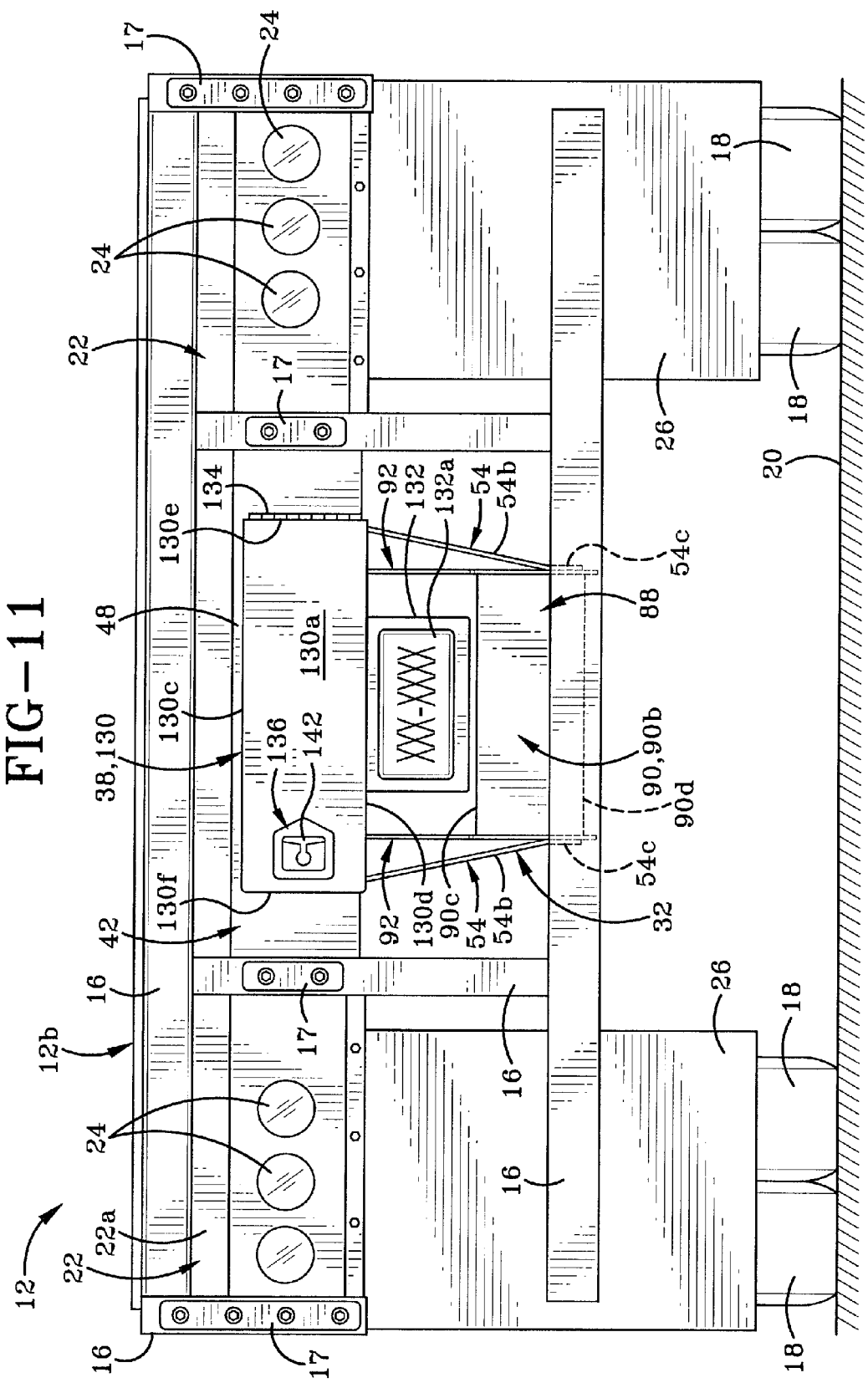
FIG. 11 is a rear view of the back region of the trailer when the stair assembly is in the storage position.

It should be understood that instead of the stair assembly 10 being engaged on frame 16 proximate the rear end 14b/16b of bed 14 and frame 16, stair assembly 10 may be engaged therewith proximate a wall panel at the front end 14a/16a of bed 14 and frame 16, or a wall panel along one or the other sides 16c thereof. Stair assembly 10 is movable between an operational position and a storage position. The operational position is illustrated in FIG. 1 and the storage position is illustrated in FIG. 11. When stair assembly 10 is in the operational position, a person "P" is able to climb up or down stair assembly 10 and thereby move between road surface 20 and bed 14 by climbing easily up the steps 30 (FIG. 2) thereof. When stair assembly 10 is in the storage position, person "P" moves with greater difficulty and less safety between road surface 20 and bed 14 in that they must climb up onto the workbed 14 without the assistance of steps and are forced to jump off workbed 14 to return to the road surface 20.

Figure 2:
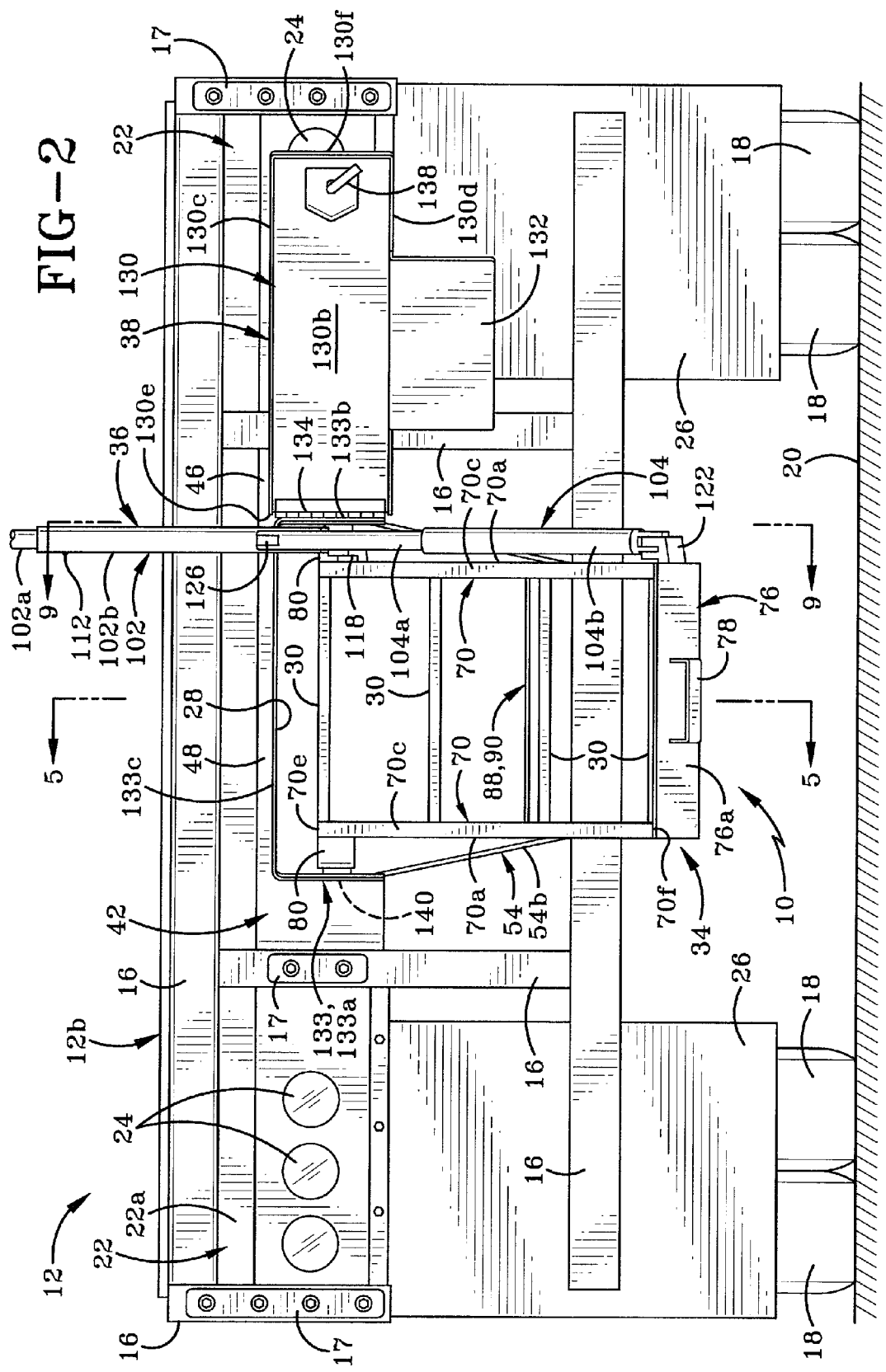
FIG. 2 is a rear view of the trailer showing the stair assembly in the operational position and the handrail assembly in the extended position.

Referring to FIG. 2 and in accordance with a specific feature of the present invention, stair assembly 10 comprises a track assembly 32, a step assembly 34, a handrail assembly 36, and a door assembly 38, as well as first and second pivot assemblies 86, 88. As will be hereinafter described, track assembly 32 is secured to frame 16, step assembly 34 is engaged with track assembly 32 by first and second pivot assemblies 86, 88, handrail assembly 36 is engaged with step assembly 34, and door assembly 38 is engaged with track assembly 32.

Figure 6:
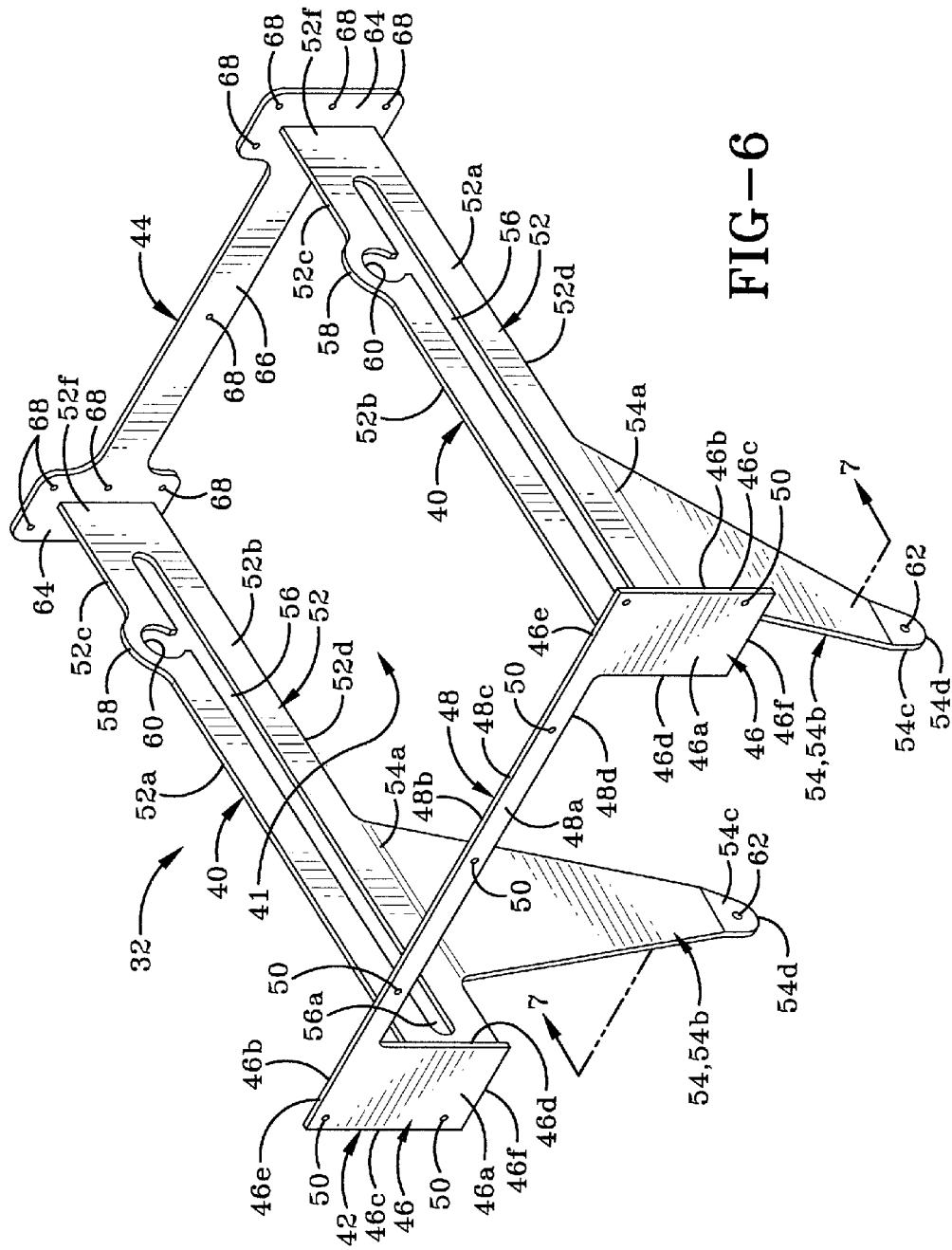
FIG. 6 is a perspective rear view of the track assembly of the stair assembly with all other components removed for clarity.
Figure 7:
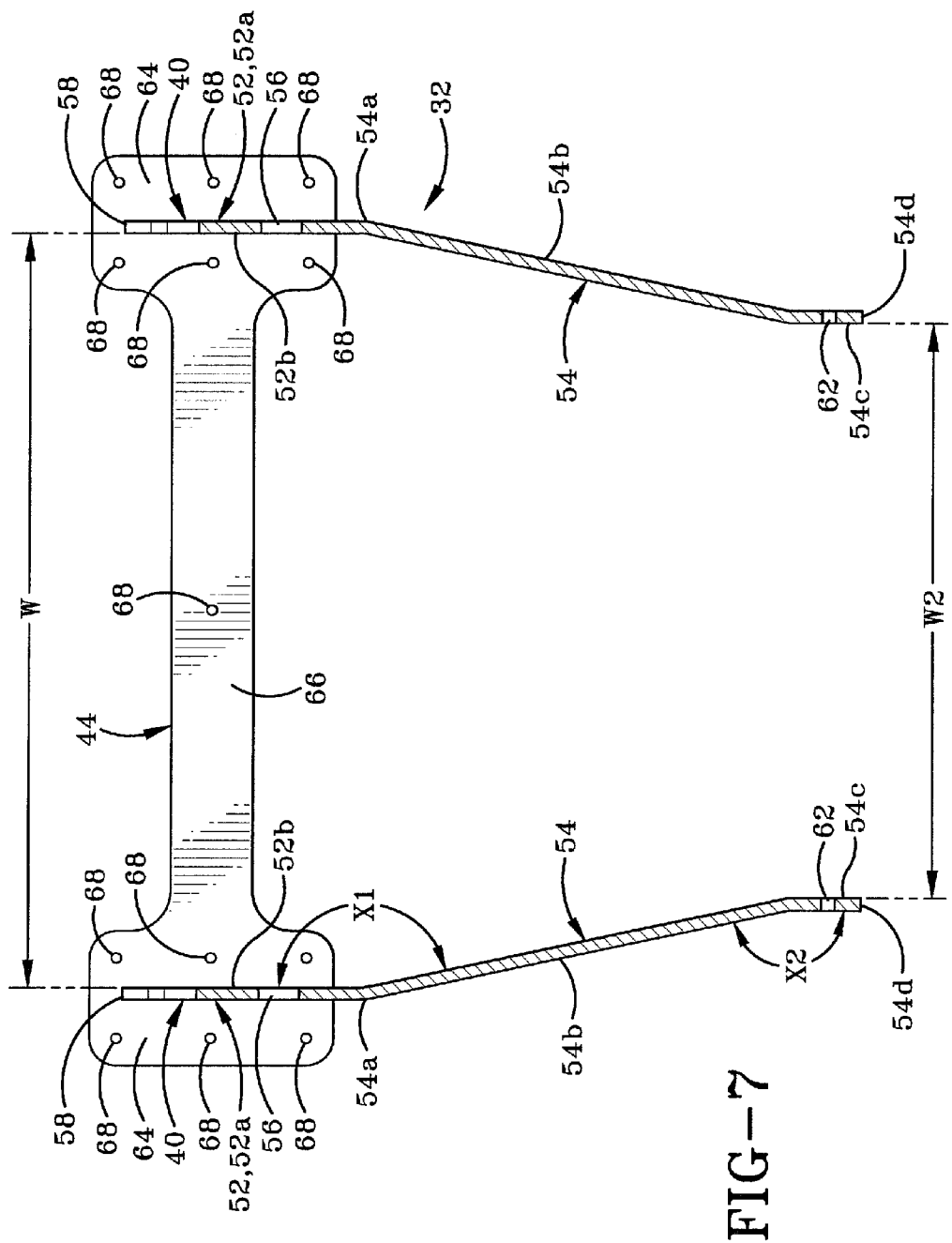
FIG. 7 is a rear view of the track assembly taken through line 7-7 of FIG. 6.
Figure 8:
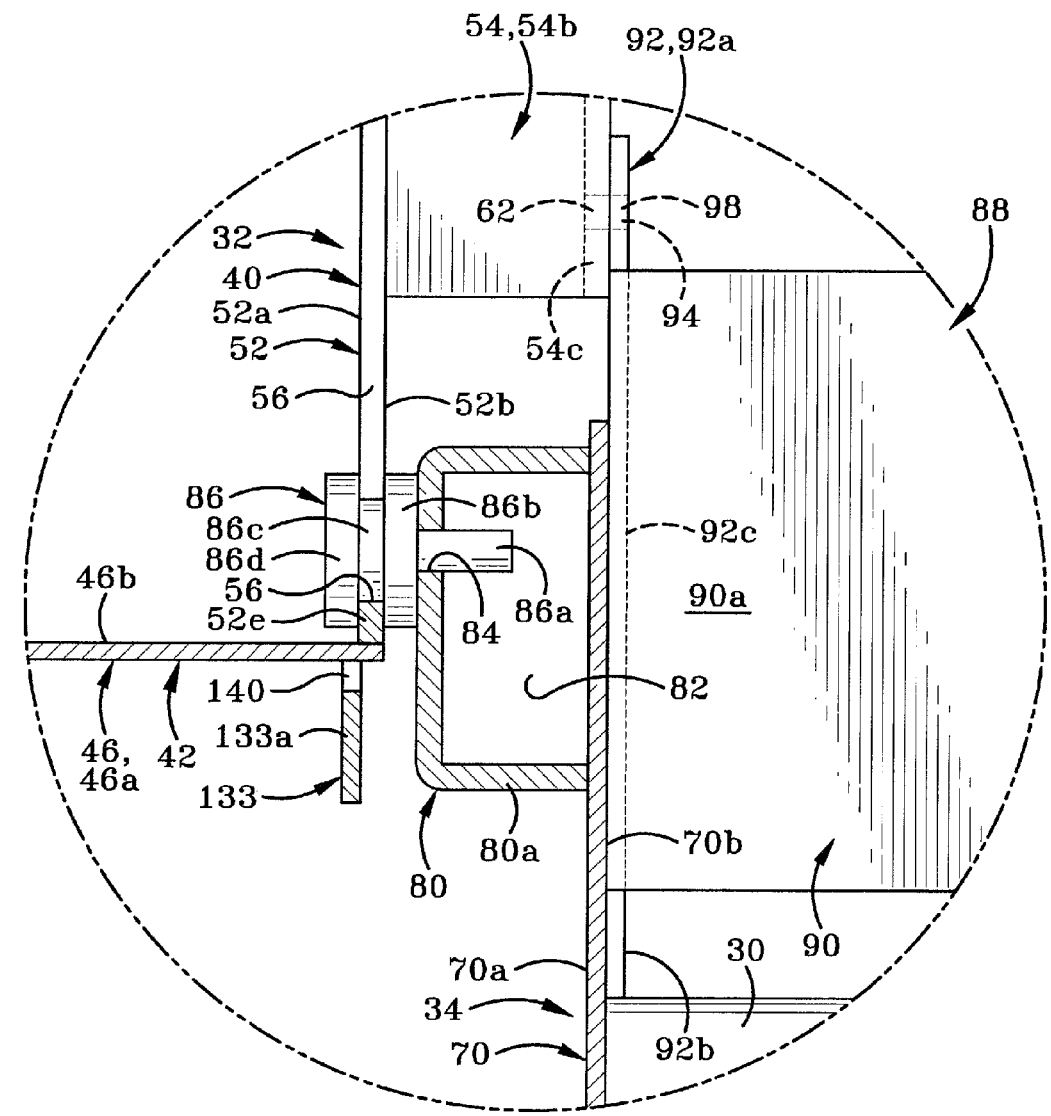
FIG. 8 is a top view of the engagement of a roller of the step assembly sub-assembly and the track assembly taken through line 8-8 of FIG. 5.

Track assembly 32 is shown by itself in FIGS. 6 and 7. Track assembly 32 includes two spaced apart tracks, a sill 42, and a plate 44 that are all engaged with each other. Sill 42 and plate 44 are disposed substantially at right angles relative to tracks 40. Tracks 40, sill 42 and plate 44 bound and define a retaining space 31 therebetween. Sill 42 is configured to be secured to a region of frame 16 and/or rear panel 22. In particular, sill 42 is disposed in abutting contact with the exterior surface 22a of rear panel 22 (FIG. 2). The positioning of sill 42 ensures that stair assembly is strong and stable and as step assembly 34 is moved through aperture 28 and into retaining space 41, as will be hereinafter described, rear panel 22 will substantially resist the inward force of this movement and will ensure that step assembly moves smoothly into region 41.

Sill 42 is generally U-shaped (FIG. 6) and comprises a pair of sill members 46 which are each connected to opposite ends of a crossbar 48. Sill members 46 and crossbar 48 are substantially planar members which are coplanar with each other. Sill members 46 are substantially identical. Each sill member 46 is generally rectangular in shape, having an exterior surface 46a, an interior surface 46b (FIG. 5), an outside edge 46c (FIG. 6), an inside edge 46d, a first end 46e and a second end 46f. Crossbar 48 is an elongate planar member that extends between the inside edges 46c of the two sill members 46 and has an exterior surface 48a that is coplanar with exterior surface 46a, and an interior surface 48b that is coplanar with interior surface 46b. Crossbar 48 further includes a first end 48c that is coplanar with first ends 46e and a second end 48d that is spaced a distance inwardly from second ends 46f of sill members 46. While inside edges 46d and second end 48d are shown as being straight edges, it will be understood that they may be shaped and notched in order to be complementary to aperture 28 and/or to portions of door assembly 38. Sill 42 preferably is manufactured from a suitable metal and is configured either a single unit or sill members 46 and crossbar 48 are single members that are welded together or otherwise joined. Sill 42 is secured to exterior surface 22a of rear panel 22 by any suitable means such as nuts and bolts, rivets, welding, or adhesives. As illustrated, sill 42 is configured to be secured to rear panel 22 by a plurality of nuts and bolts (not shown), and to that end, a plurality of holes 50 are provided therein through which the bolts may be received. When sill 42 is secured to frame 16 and/or rear panel 22 it serves to strengthen and reinforce those portions of frame 16 and/or rear panel 22 which define aperture 28.

Figure 3:
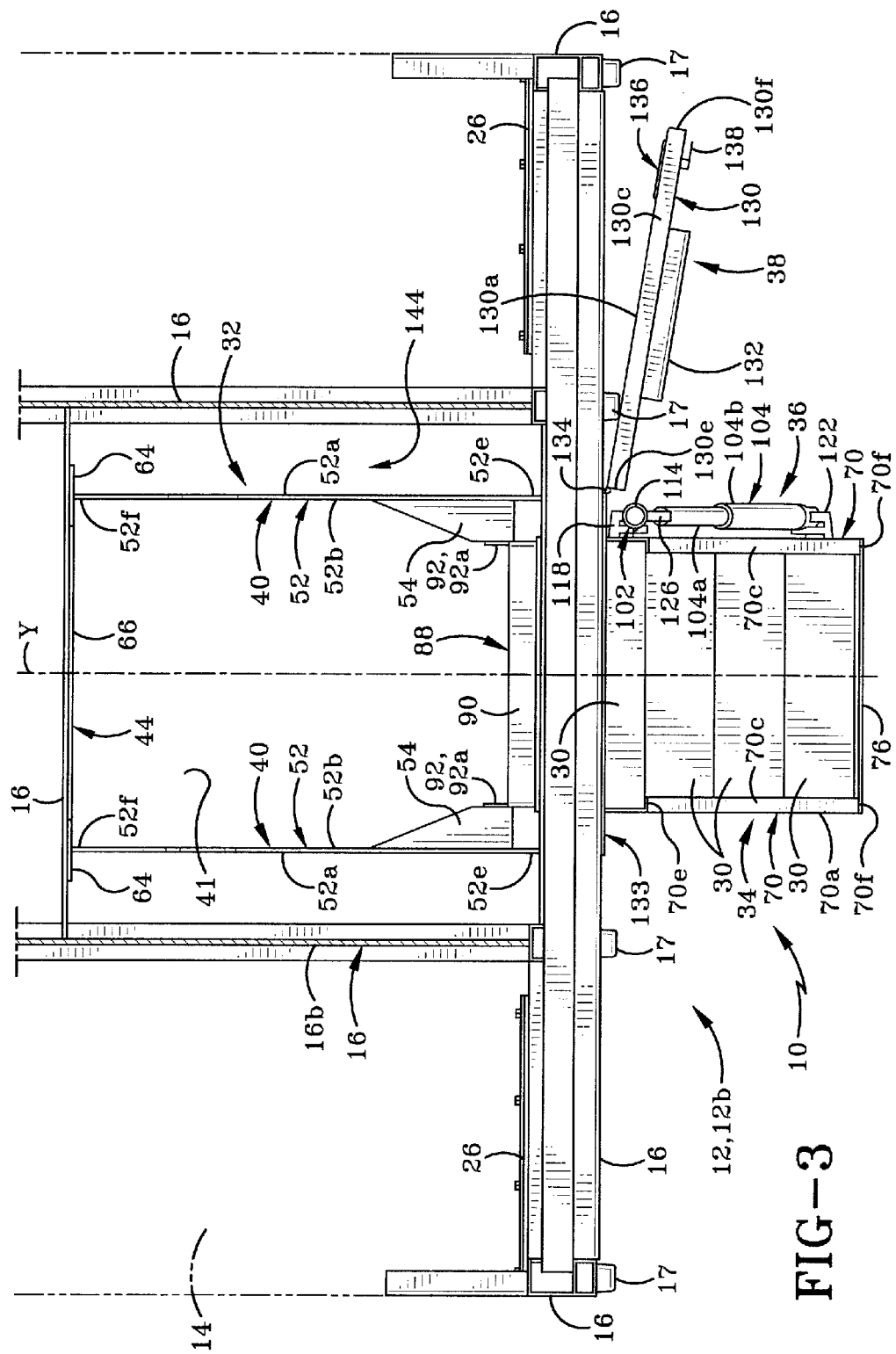
FIG. 3 is a top view of a back region of the trailer showing the stair assembly in the operational position and the handrail assembly in the extended position.

Each track 40 extends inwardly away from interior surfaces 46b, 48b of sill 42 and away from interior surface 22b of rear panel 22. Tracks 40 are oriented substantially at right angles to the interior surfaces 46b of sill 42 and are disposed generally parallel to each other. Tracks 40 each comprise a guide portion 52 and a pivot support 54. As best seen in FIG. 3, each guide portion 52 is an elongate, generally planar member that extends substantially parallel to longitudinal axis "Y" of track assembly 32. Each guide portion 52 has an exterior surface 52a, an interior surface 52b, a top 52c (FIG. 5), a bottom 52d, a first end 52e and a second end 52f. First end 52e is engaged with sill 42 and second end 52f is engaged with plate 44 in any suitable manner. For example, first and second ends 52e, 52f may be welded to sill 42 and plate 44. Although not shown herein, first and second ends 52e, 52f may, alternatively, be specially shaped and interlockingly engaged in complementary notched regions in sill 42 and plate 44.

In accordance with a specific feature of the present invention, a longitudinally aligned slot 56 (FIG. 5) is defined in each guide portion 52. Slot 56 originates a distance inwardly from first end 52e of guide portion 52 and terminates a distance inwardly from second end 52f thereof. Slot 56 extends between exterior and interior surfaces 52a, 52b and is of a height "H2" and length "L". Top 52c of guide portion 52 includes a generally semi-circular protrusion 58 in a region proximate plate 44. A generally C-shaped aperture 60 is defined within protrusion 58 and is in communication with slot 56. The purpose of slot 56 and aperture 60 will be described later herein.

Each pivot support 54 is a generally triangular region when viewed from the side and is integral with and extends downwardly from bottom 52d of one of guide portions 52. Alternatively, pivot support 54 may be manufactured as a separate component that is welded or otherwise secured to its associated guide portion 52. As best seen in FIG. 7, each pivot support 54 is not coplanar along its width and length with its associate guide portion 52. Instead, when pivot support 54 is viewed from the front or rear, it comprises an upper region 54a, a middle region 54b and a lower region 54c. Upper region 54a is generally aligned with interior surface 52b of guide portion 52 and is therefore disposed at a first angle of about 0° or 180° to guide portion 52. Middle region 46 is disposed at a second angle "X1" relative to upper region 54a, and lower region 54c is disposed at a third angle "X2" relative to middle region 54b. Second angle "X1" is from around 160° to 175° and preferably is 168°, and third angle "X2" is from around 160° to 175° and preferably is 168°. Overall, each pivot support 54 is displaced around 12° relative to its associate guide portion 52. The configuration of pivot support 54 is such that the width between the upper regions 54a of the two opposed pivot supports 54 is substantially the same as the width "W". The two middle regions 54b of the opposed pivot supports 54 extend generally toward each other so the distance between them progressively narrows. Finally, the lower regions 54 are disposed generally parallel to the upper regions 54 but the distance "W2" between them is less than "W". In the preferred embodiment of the invention, the width "W" is about 29" and the width "W2" is about 22". Each pivot support 54 terminates at its lowermost end in a tip 54d. Tip 54d preferably is curved in shape and has a radius of curvature of about 1¼". Tip 54d defines a hole 62 (FIGS. 6 & 7) therein which extends between an interior surface and exterior surface of pivot support 54 such that hole 62 is substantially at right angles to the longitudinal axis "Y" of track assembly 32.

Plate 44 engages second ends 52f of tracks 40. Plate 44 comprises a generally I-shaped member when viewed from the front or rear. Plate 44 includes first and second plate members 64 and a web 66 that extends between plate members 64. Second ends 52f are disposed substantially at right angles to plate members 64 and are secured thereto by any suitable manner such as welding or engaging protrusions (not shown) on second ends 52f in complementary notches (not shown) on plate members 64. Plate 44 is secured to any suitable portion of frame 16 by fasteners such as nuts and bolts or rivets, or by welding, adhesive or any suitable means. As illustrated in FIGS. 6 & 7, plate members 64 and web 66 are provided with holes 68 therein and through which bolts (not shown) may be inserted to engage a portion of frame 16. Holes 68 extend between front and rear surfaces of plate 44 and are aligned with longitudinal axis "Y". Plate 44 gives strength and rigidity to track assembly 32. Both plate 44 and sill member 46 ensure that track assembly 32 is sufficiently secured to frame 16 so that track assembly 32 will adequately support step assembly 34 when in the storage position and the vehicle 12 is moving.

Figure 4:
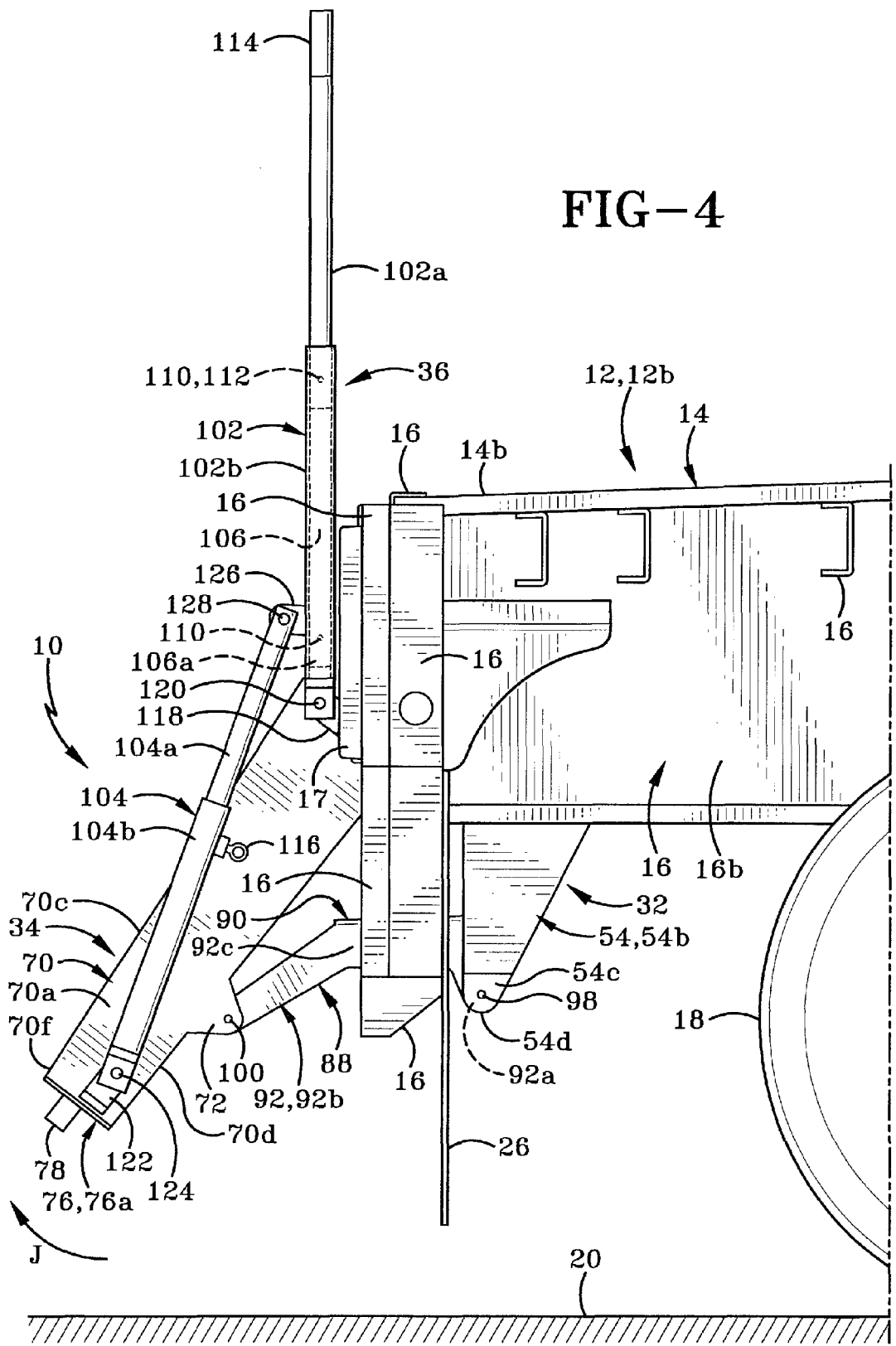
FIG. 4 is a right side view of the back region of the trailer shown in FIG. 3.

In accordance with a specific feature of the present invention and as shown in FIG. 2, step assembly 34 includes a pair of spaced apart and parallel rails 70. Each rail 70 is a generally planar member having an exterior side 70a, an interior side 70b, a first edge 70c, a second edge 70d (FIG. 4), a first end 70e and a second end 70f. First end 70e is disposed at a first angle relative to first edge 70c. Preferably, that first angle is about 235°. Essentially, this means that when step assembly 34 is disposed in the operational position, first end 70e will be generally horizontally oriented and substantially parallel to the ground surface 58 upon which step assembly 34 rests. Second end 70f is disposed at an angle of about 265° relative to first edge 70c. Additionally, as best seen in FIG. 4, first edge 70c is not parallel to second edge 70d. Instead, the distance between first and second edges 70c, 70d narrows as you move from first end 70e toward second end 70f. A generally triangular protrusion 72 (FIG. 4) extends outwardly from second edge 70d of each rail 70. Protrusion 72 is generally coplanar with rail so that an exterior surface of protrusion 72 is generally aligned with exterior surface 70a, and an interior surface of protrusion 72 is generally aligned with interior surface 70b. A hole 74 is defined in protrusion 72 and extends between the interior and exterior surfaces thereof.

A plurality of steps 30 extend between the rails 70. Specifically, each step 30 extends between the interior surfaces 70b of the two rails. Each step 30 is fixedly secured to each rail 70 and steps 30 are spaced at regular intervals from each other along the length of rails 70. Each step 30 has a first surface 30a and a second surface 30b. First surface 30a may be provided with a textured surface to substantially prevent person "P" from slipping thereon when climbing up and down steps 30. It will also be noted that steps 30 are configured so that they are substantially horizontal when step assembly 34 is in the operational position shown in FIG. 2. A base plate 76 extends between second ends 70f of the two rails 70 and is disposed generally at right angles thereto. In accordance with yet another feature of the present invention, a handle 78 extends outwardly from a central region of an exterior surface 76a of base plate 76. Exterior surface 76a is that surface which will be disposed adjacent door assembly 38 when stair assembly 10 is in the storage position and is adjacent road surface 20 when staircase assembly 10 is in the operational position.

A first pivot assembly and a second pivot assembly secures step assembly 34 to track assembly 32 and enables step assembly 34 to move between the storage and operational positions. The first pivot assembly comprises a pair of mounting brackets 80 and first and second rollers 86. Each mounting bracket 80 is secured to exterior surface 70a of one of the first and second rails 70. Mounting bracket 80 has a generally U-shaped peripheral wall 80a that is welded to exterior surface 70a so that a chamber 82 is defined between wall 80a and a portion of exterior surface 70a. An aperture 84 is defined in peripheral wall 80a in a region opposite exterior surface 70a. The shaft 86a of a flanged roller 86 is received through aperture 84 in such a way that roller 86 is able to rotate about an axis that extends through shaft 86a. Roller 86 includes first, second, and third circular regions 86b, 86c 86d, where second region 86c is of a diameter that is slightly less than height "H2" of slot 56 in track 40. The diameter of first and third circular regions 86b, 86d is slightly smaller than that of aperture 60 in track 40. When step assembly 34 is engaged with track assembly 32, third region 86d of each roller 86 is inserted through aperture 60 of one of tracks 40. Step assembly 34 is then moved slightly downwardly so that second region 86c of each roller 86 enters slot 56 of the associated tracks. Step assembly 34 is then moved toward the first ends 52e of tracks 40. The larger diameter first and third regions 86b, 86d keep step assembly 34 engaged with track assembly 32 and limit the step assembly's lateral motion relative to track assembly 32. It will be understood that mounting bracket 80 may be omitted from stair assembly 10 and roller 86 may be then secured directly to the exterior surface 70a of one of rails 70. However, mounting brackets 80 preferably are utilized as they create a space between interior surfaces 40a of tracks 40 and exterior surfaces 70a of rails 70, thereby enabling step assembly 34 to move more easily relative to track assembly 32.

Figure 5:
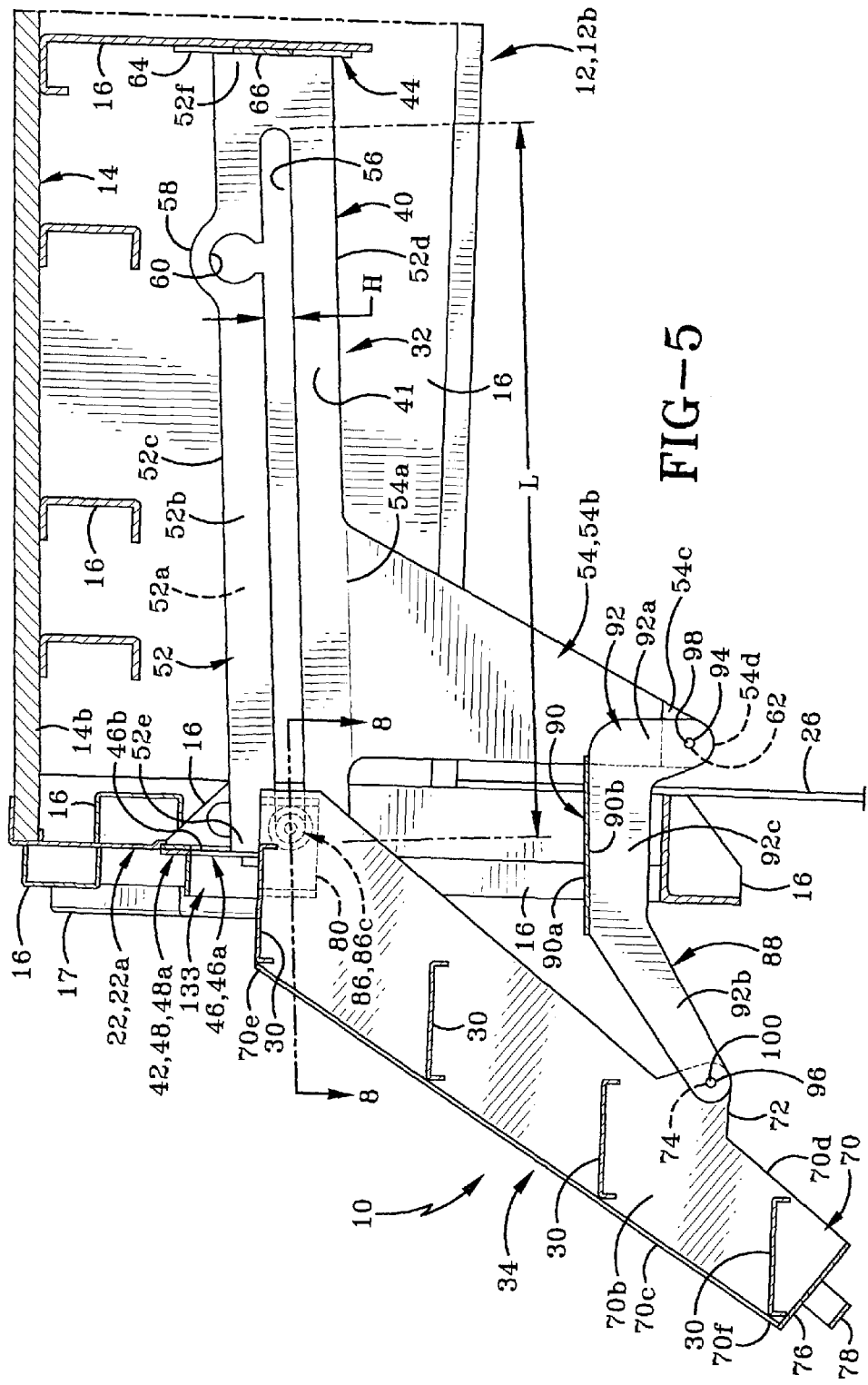
FIG. 5 is a right side view of the stair assembly and a portion of the trailer taken through line 5-5 of FIG. 2.
Figure 5A:
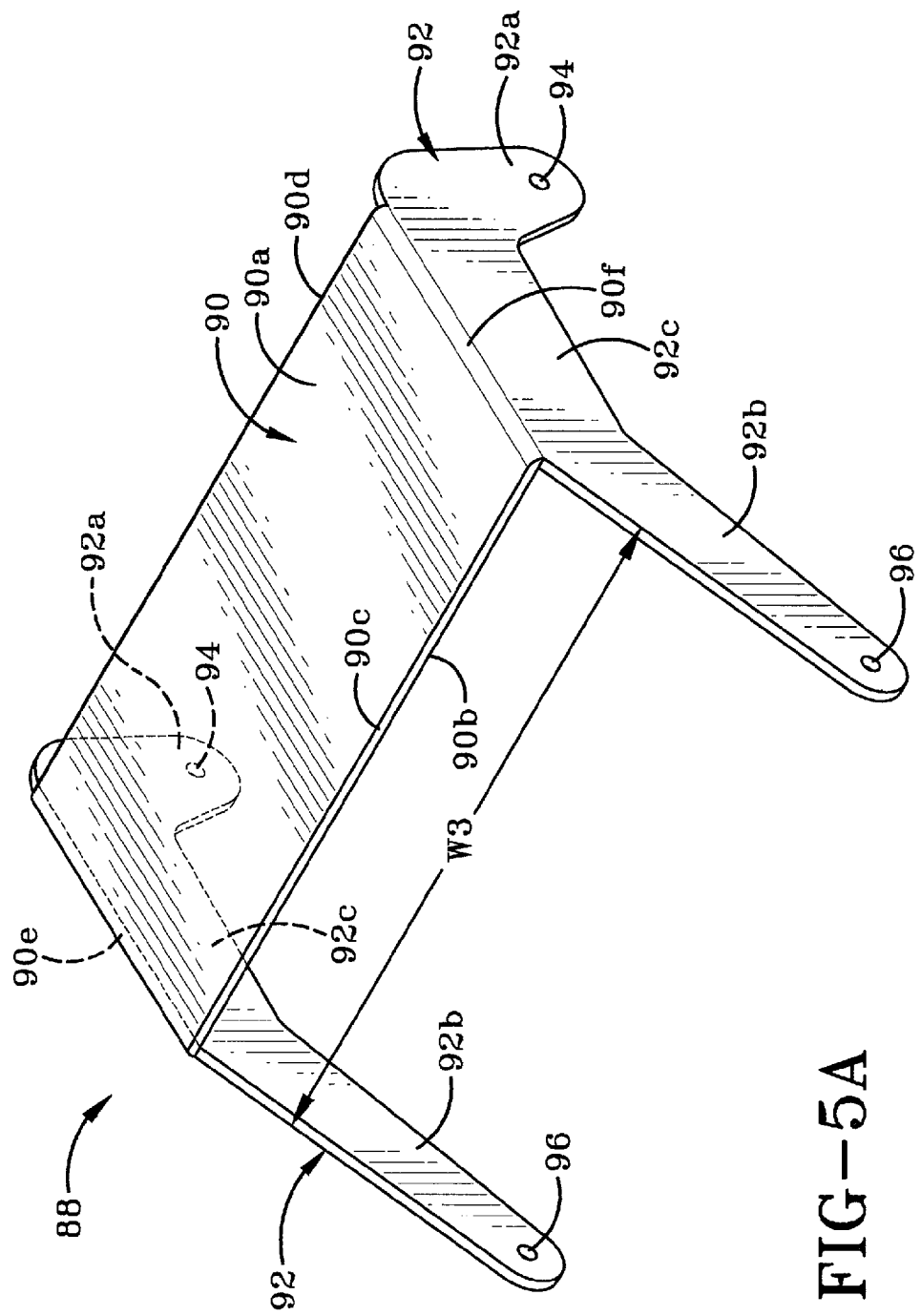
FIG. 5A is a perspective view of a first pivot assembly which secures the track assembly and step assembly together shown with all other components removed for clarity.

As indicated previously, second pivot assembly 88 (FIG. 5A) also secures step assembly 34 to track assembly 32. In particular, second pivot assembly 88 engages one or both rails 70 to one or both pivot support 54 of track assembly 32. Second pivot assembly 88 includes a base 90 and at least one but preferably two, leg members 92. Base 90 is generally rectangular in shape and is substantially planar in nature. Base 90 has a first surface 90a, a second surface 90b, a first edge 90c, a second edge 90d, and first and second ends 90e, 90f. First and second edges 90c, 90d, and first and second ends 90e, 90f extend between first and second surfaces 90a, 90b. A first leg member 92 extends downwardly away from first end 90e and a second leg member 92 extends downwardly from second end 90f. Leg members 92 are identical in configuration and are disposed generally parallel to each other. Furthermore, leg members 92 are disposed substantially at right angles to first and second surfaces 90a, 90b of base 90 and are aligned substantially parallel to longitudinal axis "Y" of track assembly 32 when step assembly 34 is engaged therewith. Each of the first and second leg members 92 includes a first region 92a and a second region 92b. The first regions 92a of the first and second leg members 92 are complementary in shape, size and position, and the second regions 92b of the first and second leg members 92 are complementary in shape, size and position. An intermediate region 92c connects first and second regions 92a, 92b on each of the first and second leg members 92. Both regions 92a, 92b have gently rounded ends remote from base 90. A first aperture 94 is defined in each first region 92a and a second aperture 96 is defined in each second region 92b. Leg members 92 are spaced a distance apart from each other. In particular, the distance between first regions 92a is substantially equal to the distance between lower regions 54c of pivot supports 54 of track assembly 32, i.e., the distance is equivalent to "W2". Additionally, the distance between second regions 92b is substantially equal to the distance between protrusions 72 on rails 70 of step assembly 34.

When second pivot assembly 88 connects step assembly 34 to track assembly 32, a first pivot pin 98 extends through each aligned set of hole 62 in pivot support 54 and first aperture 94 in first region 92a. A second pivot pin 100 extends through each aligned set of hole 74 in protrusion 72 of each rail 70 and second aperture 96 in each second region 92b. It will be understood that a single first pivot pin 98 can extend through both sets of aligned holes 62 and first aperture 94 or two separate first pivot pins can be used for this purpose. Similarly, a single second pivot pin 100 can extend through both sets of aligned holes 74 and second apertures 96 or to separate pivot pins can be used for this purpose.

Second pivot assembly 88 is effectively both a mechanism for connecting track assembly 32 and step assembly 34 together and enabling them to pivot relative to each other (along with rollers 86) but the second pivot assembly 88 also serves as a bracing member, strengthening and supporting step assembly 34 so that the person can climb up and down the stairs in relative safety. The configuration of pivot support 88 also aids in distributing forces on step assembly 34 during use to track assembly 32 and to frame 16. Pivot support 88 also substantially reduces any lateral motion in step assembly when it is used by the person.

Figure 9:
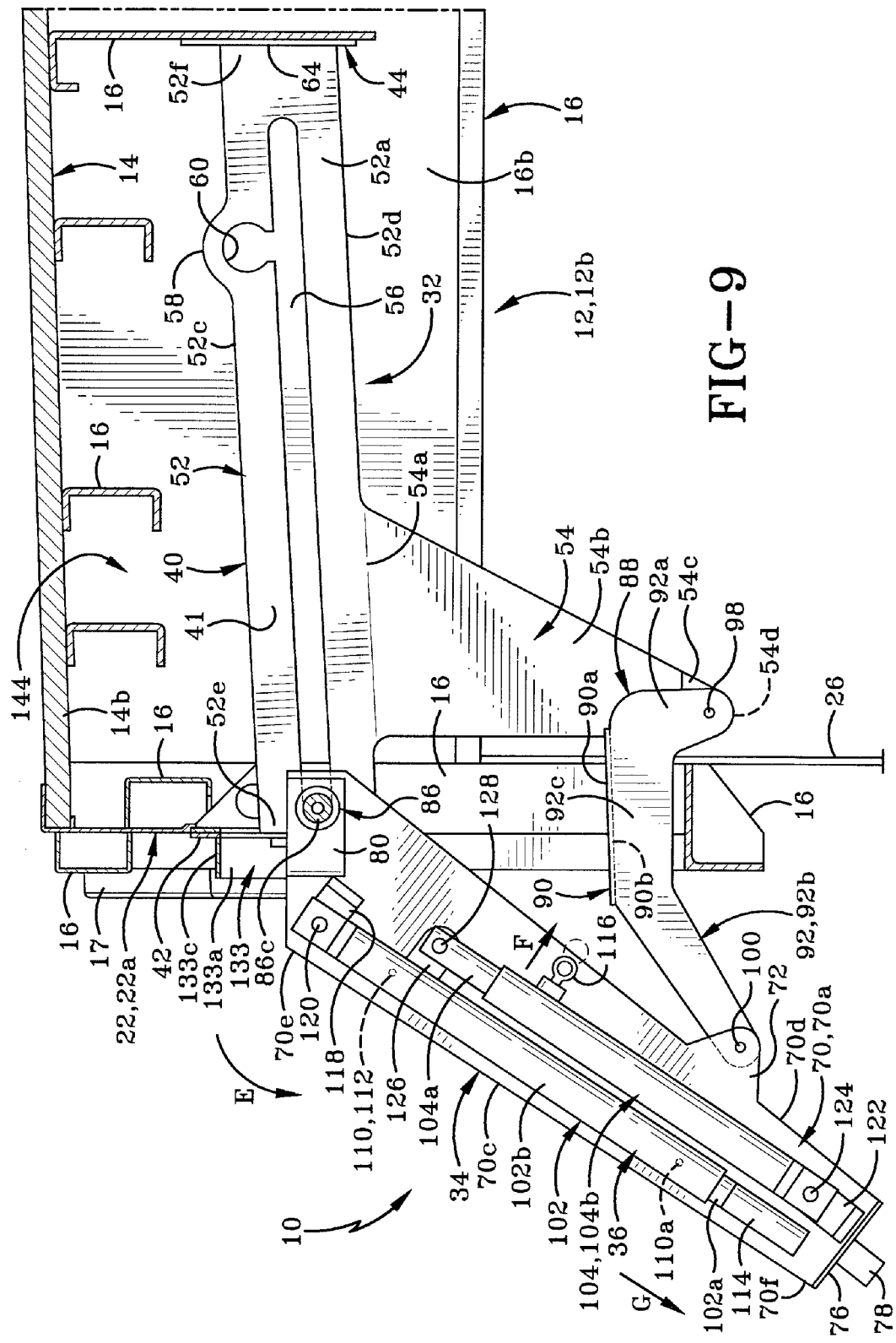
FIG. 9 is a right side view of the stair assembly and portion of the trailer taken through line 9-9 of FIG. 2 showing the stair assembly in the operation position and the handrail assembly in a collapsed position.

In accordance with yet another specific feature of the present invention, stair assembly 10 includes handrail assembly 36 which comprises a bar 102 and a support arm 104. Bar 102 includes a first bar member 102a and a second bar member 102b (FIG. 4). Both of first and second bar members 102a, 102b are generally hollow, cylindrical components that are configured to telescope relative to each other. In particular, second bar member 102b defines a bore 106 therein that is of a size complementary to an exterior diameter of first bar member 102a. An end region of first bar member 102a is received in bore 106. Although not shown herein, a spring may be disposed between the end region of first bar member 102a and an interior end 106a of bore 106. Two spaced-apart apertures 110 are defined in the exterior wall of second bar member 102b and a depressible button 112 extends outwardly from the exterior surface of the end region of first bar member 102a. Button 112 is selectively engageable in one of apertures 110 as handrail assembly 36 is moved between an extended position (FIG. 4) and a collapsed position (FIG. 9). A hand grip 114 is provided at the outermost end of first bar member 102a.

Support arm 104 comprises a first and second arm member 104a, 104b that are similarly configured like bar 102 to telescope relative to each other as handrail assembly 36 is moved between the extended and collapsed positions. Each of the first and second arm members 104a, 104b is generally cylindrical and at least second arm member 104b includes a bore (not shown) that is sized to receive an end region of first arm member 104a therein. Support arm 104 includes a pin 116 that can be pulled slightly outwardly through an aperture (not shown) in second arm member 104 to permit telescoping movement of first and second arm members 104a, 104b. Pin 116 can be of any suitable construction such as being spring loaded to clampingly engage the exterior surface of first arm member 104 to lock first and second arm members 104a, 104b together.

Figure 10:
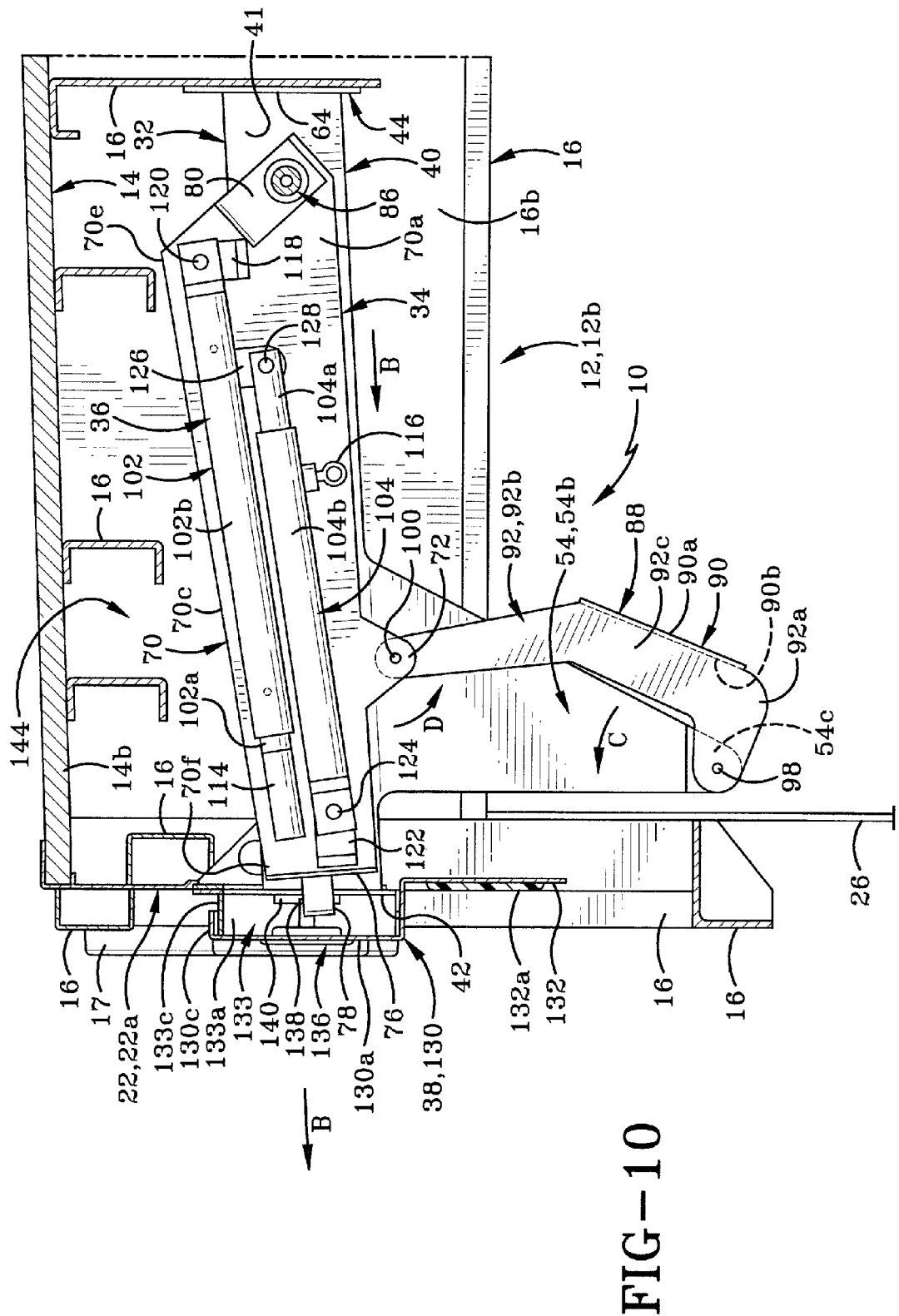
FIG. 10 is a right side cross-sectional view of the back region of the trailer showing the stair assembly in a storage position.

A first clevis bracket 118 having a first pivot pin 120 secures second bar member 102b to step assembly 34, and a second clevis bracket 122 having a second pivot pin 124 secures second arm member 104b to step assembly 34. First pivot pin 120 engages first end 70e of rail 70 proximate mounting bracket 80 as best seen in FIG. 10. Second pivot pin 124 engages second end 70f of rail 70. A third clevis bracket 126 is provided on second bar member 102b and a pivot pin 128 secures second arm member 102b to first arm member 104a.

Referring to FIG. 2 and in accordance with yet another specific feature of the present invention, door assembly 38 includes a door 130 and a license plate flange 132. Door assembly 38 further includes a door relief 133 by a hinge 134. Specifically, door relief 133 is generally U-shaped and includes a first side 133a, a second side 133b, and a top portion 133 that extends between first and second sides 133a, 133b. Door relief 133 is secured to exterior surfaces 46a, 48a of sill 42 adjacent aperture 28. First side 133a of door relief 133 includes a notched recess 140. Door 130 has an exterior surface 130a, an interior surface 130b, a top end 130c, a bottom end 130d, a first side 130e and a second side 130f. Door 130 is complementary shaped to be received in aperture 28 or may be slightly larger than aperture 28 and close off access to the same. A latching mechanism 136 is provided on door 138 to releasably secure door 138 to sill 42 when door assembly 38 is in the closed position (FIG. 11). Latching mechanism 136 may be of any type known in the art. Preferably, latching mechanism 136 includes a latch 138 (FIG. 3) that is receivable in a recessed region 140 (FIG. 2) when door 138 is closed. A handle 142 on latching mechanism is used to disengage latch 138 from recessed region 140 when door 138 is to be opened. Door assembly 38 is shown in the opened position in FIG. 3 and when door assembly 38 is in this opened position, step assembly 34 may be moved between its storage position and operational position. Door assembly 38 is only able to be moved to the closed position when step assembly 34 is in the storage position.

License plate flange 132 is integral with door 130 and extends downwardly from the bottom end 130d thereof. Flange 132 is generally rectangular in shape and has an exterior surface that is offset relative to the exterior surface of door 130 as is shown in FIG. 10. A license plate 132a is secured to an exterior surface of flange 132.

Stair assembly 10 in accordance with the present invention is used in the following manner. When a person "P" needs to climb onto bed 14 of vehicle 12, stair assembly 10 is moved from the storage position (FIGS. 11 & 12) to the operational position (FIG. 2). In order to do this, handle 142 on door is engaged to move latch 138 out of notched region 140. Door 130 is then rotated from the closed position (FIG. 11) to the open position by rotating it in the direction of arrow "A" (FIG. 12) about hinge 134. Handle 78 on the base plate 76 of step assembly 34 is grasped and step assembly 34 is pulled outwardly from underneath bed 14 in the direction of arrow "B" (FIG. 10). As step assembly 34 moves in this direction, rollers 86 slide along slots 56 in tracks 40 in the direction of arrow "B", second pivot assembly 88 pivots about pivot pin 98 in the direction of arrow "C" and about pivot pin 100 in the direction of arrow "D". Second pivot assembly 88 functions to stabilize step assembly 34 as it glides out of the space 41 and along tracks 40 and substantially prevents lateral motion of step assembly 34 so that rollers 86 do not bind up on track 40 and cease to roll smoothly.

When rollers 86 reach the first end 56a (FIG. 6) of slot 56, they serve as pivot pins and step assembly 34 rotates about an axis that extends along the shafts 86a of rollers 86 and in the direction of arrow 'E" (FIG. 9). At this point, step assembly 34 is inclined at an angle relative to the rear end 12b of vehicle 12 and stair assembly 10 is in the operational position. Preferably, the angle of step assembly 34 relative to the rear end 12b is about 51°. As shown in FIG. 1, base plate 76 of step assembly 34 preferably is disposed a distance vertically above road surface 20. This feature ensures that step assembly 34 will not prematurely contact road surface 20 so that steps 30 are inclined at an angle other than parallel to the road surface 20. If steps 30 are not parallel to road surface 20, the feet of person "P" could possibly slip off steps 30 as they climb onto or off of bed 14 and the person could hurt themselves. When stair assembly 10 is in the operational position, steps 30 are disposed substantially parallel to bed 14 and to road surface 20 thereby presenting a safe surface for the person "P" to step onto.

Once step assembly 34 is in the position shown in FIG. 9, handrail assembly 36 is moved from the collapsed position (FIG. 9) to the extended position (FIG. 4). In order to do this, the person will grasp hand grip 114 with one hand and pull pin 116 outwardly in the direction of arrow "F" with their other hand. While keeping the pin 116 in the pulled out position, the person rotates bar 102 about pivot 120 in the opposite direction of arrow "E". The rotational motion of bar 102 will simultaneously cause support arm 104 to extend in length as first arm member 104a slides out of the bore of second arm member 104b. The person will then release pin 116 which will then move in the opposite direction to arrow "F" and lock first and second arm members 104a, 104b in the fully extended position. The person will then depress button 112 so that it slides into bore 106 of second bar member 102b. First bar member 102a is simultaneously pulled outwardly from bore 106 in the direction of arrow "G". When button 112 encounters aperture 110a (FIG. 9), it will pop through aperture 110a and lock first bar member 102a in the extended position shown in FIG. 4. When handrail assembly 36 is in the fully extended position shown in FIG. 4 it is then safe for the person "P" to grasp onto hand grip 14 as the climb up and down steps 30.

Figure 12:
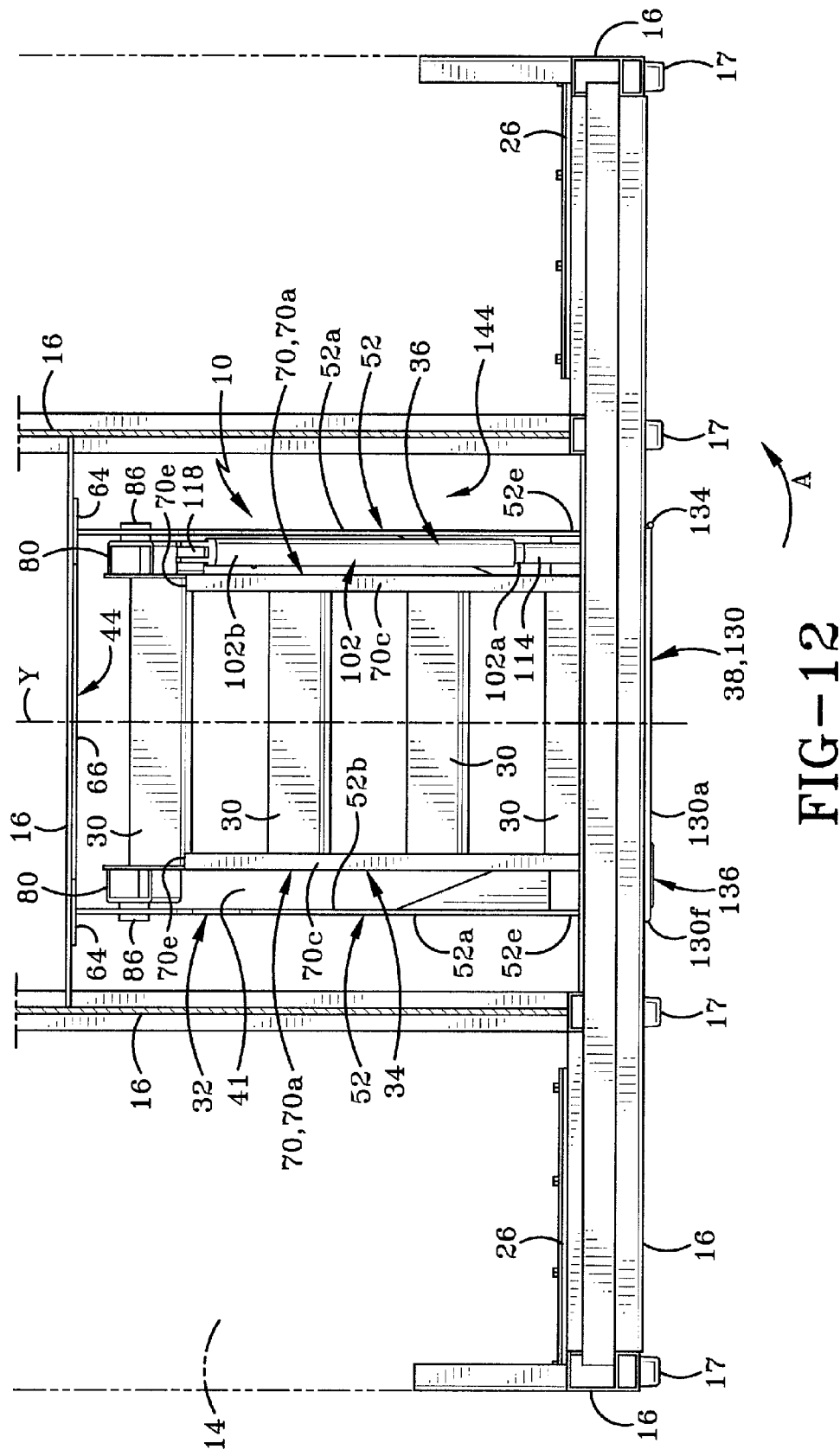
FIG. 12 is a top view of the back region of the trailer with the trailer bed removed for the sake of clarity and showing the stair assembly engaged with the trailer frame and in the storage position.

When the stair assembly 10 is no longer needed to climb onto and off of bed 14, handrail assembly 36 is moved to the collapsed position by reversing the steps set out above. Once handrail assembly 36 is in the collapsed position, the person will grasp handle 78 on step assembly 34 and will lift it upwardly in the direction of arrow "J" (FIG. 4). This motion causes step assembly 34 to pivot about the axis that extends through shafts 86a of rollers 86 and causes second pivot assembly 88 to pivot about pivot pins 100, 98 in the opposite directions to arrows "D" and "C" respectively. When step assembly 34 is disposed generally parallel to road surface 20, it is pushed inwardly toward rear panel 22 in the opposite direction to arrow "B" (FIG. 10). This motion causes rollers 86 to rotate and travel along tracks 40 so that step assembly 34 slides into a compartment 144 defined by a bottom surface 14b of bed 14, tracks 40, plate 42, an interior surface of rear panel 22 and portions of frame 16. When base plate 76 and handle 78 have moved through aperture 28, door assembly 38 is moved from the open position to the closed position by rotating it in the opposite direction of arrow "A (FIG. 12). Handle 142 is manipulated to engage latch 138 in recessed region 140 and vehicle 12 is then ready to travel over road surface 20.

Stair assembly 10 is thus easily accessed and readily deployed when it is needed but is quickly and easily stored when it no longer needed. The positioning of stair assembly 10 beneath bed 14 and in between various frame members 16 ensures that it does not adversely interfere with the airflow around vehicle 12 and is unlikely to contact obstacles that may protrude upwardly from the road surface over which vehicle 12 travels.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A retractable stair assembly for a vehicle comprising:
   a track assembly adapted to be engaged to a portion of the vehicle's frame; said track assembly comprising:
   a first track and a second track disposed parallel to each other; wherein each of the first and second tracks has an interior surface, an exterior surface, a top, a bottom, a first end and a second end;
   a space defined between the interior surface of the first track and the interior surface of the second track;
   a slot defined in each of the first and second tracks, said slot extending from proximate the first end thereof to proximate the second end thereof;
   a step assembly having a first end and a second end;
   a first pivot assembly securing the first end of the step assembly to the track assembly;
   a second pivot assembly securing a portion of the step assembly intermediate the first and second ends thereof to the track assembly; and wherein the step assembly is movable between a storage position and an operational position; and when the step assembly is in the storage position the step assembly is disposed in the space between the first and second tracks; and when the step assembly is in the operational position the step assembly extends outwardly and downwardly from the first ends of the first and second tracks and is adapted to extend downwardly toward a surface upon which the vehicle rests.

2. The stair assembly as defined in claim 1, wherein the step assembly pivots about the first and second pivot assemblies and relative to the track assembly as the step assembly moves between the storage and operational positions.

3. The stair assembly as defined in claim 1, wherein the step assembly includes:
   a first rail;
   a second rail, wherein the first and second rails are disposed parallel to each other and spaced a distance apart; and wherein each of the first and second rails has an interior surface, an exterior surface, a top, a bottom, a first end, and a second end; and
   a plurality of steps extending between the interior surface of the first rail and the interior surface of the second rail, said steps being disposed at spaced intervals from each other and being disposed parallel to each other; and wherein the first ends of the first and second rails comprises the first end of the step assembly and the second ends of the first and second rails comprises the second end of the step assembly.

4. The stair assembly as defined in claim 3, wherein the first pivot assembly comprises:
   a first roller operationally engaged with the exterior surface of the first rail; and
   a second roller operationally engaged with the exterior surface of the second rail; and wherein the first roller is receivable in the slot in the first track and the second roller is receivable in the slot in the second track; and wherein the first and second rollers are rotatable about an axis disposed at right angles to the longitudinal axis of the track assembly to move the first end of the step assembly between the first and second ends of the first and second tracks.

5. The stair assembly as defined in claim 4, wherein each of the first and second rollers is positioned proximate the first ends of the first and second tracks when the step assembly is pivoted between the storage and operational positions.

6. The stair assembly as defined in claim 3, wherein the second pivot assembly is secured to at least one of the first and second rails and is secured to at least one of the first and second tracks.

7. The stair assembly as defined in claim 6, wherein the second pivot assembly comprises:
   a base having a first surface, a second surface, a first side, a second side, a first edge, and a second edge, and wherein the first and second sides and the first and second edges extend between the first and second surfaces;
   a first leg member extending outwardly from the second surface of the plate and substantially at right angles thereto; and wherein the first leg member includes:
      a first region and a second region spaced from each other;
      a first aperture defined in the first region;
      a second aperture defined in the second region;
      a first pivot pin extending through the first aperture and engaging the one of the first and second tracks; and
      a second pivot pin extending through the second aperture and engaging the one of the first and second rails.

8. The stair assembly as defined in claim 7, wherein the one of the first and second tracks further comprises:
   a first pivot support extending downwardly from the bottom of the one of the first and second tracks, said first pivot support being adapted to extend toward the surface upon which the vehicle rests;
   a first hole defined in the first pivot support, and wherein the first pivot pin is receivable through the first hole in the first pivot support and the first aperture of the second pivot assembly.

9. The stair assembly as defined in claim 8, wherein the one of the first and second rails further includes:
   a second hole defined between the interior and exterior surfaces thereof of the one of the first and second rails; and wherein the second pivot pin is receivable through the second hole and the second aperture.

10. The stair assembly as defined in claim 9, wherein the second pivot assembly is secured to both of the first and second rails and to both of the first and second tracks.

11. The stair assembly as defined in claim 10, wherein the second pivot assembly further includes:
   a second leg member extending outwardly from the second surface of the plate and substantially at right angles thereto; wherein the first leg member is disposed adjacent the first side of the base and the second leg member is disposed adjacent the second side of the base; and wherein the second leg member includes:
      a first region and a second region spaced from each other;
      a first aperture defined in the first region;
      a second aperture defined in the second region;
      and a third pivot pin extends through the first aperture in the second leg member and engaging the other of the first and second tracks; and
   a fourth pivot pin extends through the second aperture in the second leg member and engages the other of the first and second rails.

12. The stair assembly as defined in claim 11, further comprising:
   a second pivot support extending downwardly from the bottom of the other of the first and second tracks, said second pivot support being adapted to extend toward the surface upon which the vehicle rests;
   a first hole defined in the second pivot support, and wherein the third pivot pin is receivable through the first hole in the second pivot support and the first aperture in the second leg member of the second pivot assembly;
   a second hole defined between the interior and exterior surfaces of the other of the first and second rails; and wherein the fourth pivot pin is receivable through the second hole in the other of the first and second rails and the second aperture in the second leg member of the second pivot assembly.

13. The stair assembly as defined in claim 12, wherein the first and second pivot supports angle inwardly towards each other in a direction extending outwardly away from the bottom of the first and second tracks.

14. The stair assembly as defined in claim 1, further comprising a handle disposed on the second end of the step assembly.

15. The stair assembly as defined in claim 1, further comprising a handrail assembly which is pivotally engaged with the step assembly, said handrail assembly being movable between a collapsed position and an extended position, and when the stair assembly is in the storage position, the handrail assembly is in the collapsed, and when the stair assembly is in the operational position, the handrail assembly is in the extended position.

16. The stair assembly as defined in claim 15, wherein the handrail assembly comprises:

a bar pivotally secured to the step assembly proximate a first end thereof;

a support arm pivotally secured to the step assembly proximate a second end thereof;

a pivot engaging the bar assembly to the support arm.

17. The stair assembly as defined in claim 16, wherein the bar comprises a first bar section and a second bar section that are telescopingly engaged with each other such that the overall length of the bar is adjustable.

18. The stair assembly as defined in claim 16, wherein the support arm comprises a first arm section and a second arm section that are telescopingly engaged with each other such that the overall length of the support arm is adjustable.

19. In combination:

a vehicle having a frame, a workbed mounted on the frame and having a lower surface adapted to be disposed a distance above a surface upon which the vehicle rests; and a wall panel mounted on the frame substantially at right angles to the workbed;

an aperture defined in the wall panel; said aperture providing entry to a region disposed beneath the lower surface of the workbed;

a stair assembly engaged with the frame of the vehicle; wherein the stair assembly comprises:

a step assembly having a first end and a second end;

a track assembly mounted on the vehicle frame in the region below the lower surface of the workbed and inwardly of the aperture; said track assembly comprising:

a first track and a second track extending inwardly from adjacent the aperture and substantially at right angles to the wall panel, wherein the first and second tracks are disposed parallel to each other and each has an interior surface, an exterior surface, a top, a bottom, a first end and a second end;

a space defined between the interior surface of the first track and the interior surface of the second track;

a slot defined in each of the first and second tracks, said slot extending from proximate the first end thereof to proximate the second end thereof;

a first pivot support extending downwardly from the bottom of the first track and a second pivot support extending downwardly from the bottom of the second track;

a first pivot assembly securing the first end of the step assembly to the track assembly; said first pivot assembly engaging in the slots of the first and second tracks;

a second pivot assembly securing a portion of the step assembly intermediate the first and second ends thereof to the first and second pivot supports of the track assembly; and wherein the step assembly is movable between a storage position and an operational position; and when the step assembly is in the storage position the step assembly is disposed in the space between the first and second tracks and beneath the lower surface of the workbed; and when the step assembly is in the operational position the step assembly extends outwardly from the first ends of the first and second tracks and through the aperture in the wall panel; ad the step assembly is angles downwardly and outwardly from the wall panel and towards the surface upon which the vehicle rests.

20. The combination as defined in claim 19, further comprising a handrail assembly engaged with the step assembly; and wherein the handrail assembly is movable between an extended position and a collapsed position, and when the step assembly is in the operational position, the handrail assembly is in the extended position; and when the step assembly is in the storage position, the handrail assembly is in the collapsed position.

21. The combination as defined in claim 19, further comprising a door assembly that is engageable with the track assembly; and wherein the door assembly includes a door that is movable between an open position and a closed position; and wherein the door is in the open position when the step assembly is in the operational position, and the door is movable to the closed position when the step assembly is in the storage position.

22. The combination as defined in claim 21, wherein the door assembly further includes a flange that extends downwardly from a bottom of the door, and said flange is adapted to support a license plate on an exterior surface thereof.

\* \* \* \* \*